J. R. DONNELLY.
GAME BOARD.
APPLICATION FILED APR. 30, 1921.

1,422,042.

Patented July 4, 1922.

John R. Donnelly
INVENTOR

BY Victor J. Evans
ATTORNEY

WITNESS:

UNITED STATES PATENT OFFICE.

JOHN R. DONNELLY, OF FAIRFIELD, MAINE.

GAME BOARD.

1,422,042.                   Specification of Letters Patent.        Patented July 4, 1922.

Application filed April 30, 1921. Serial No. 465,785.

*To all whom it may concern:*

Be it known that I, JOHN R. DONNELLY, residing at Fairfield, in the county of Somerset and State of Maine, have invented new and useful Improvements in Game Boards, of which the following is a specification.

This invention relates to game boards, and has particular application to what is generally known as the ouija board. In boards of this character, use is made of a three legged table which is moved about the board during the playing of the game, one of which legs is used as an indicator to co-operate with letters and numerals on the board in the spelling of various words combining several numerals for a particular number.

It is the purpose of this invention to provide a game board with which the use of a three legged table is dispensed, making use of a rotary member positioned centrally of the board and equipped with a pointer or indicator to co-operate with letters and numerals for the same purpose as above stated, in connection with the three legged table.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein.

Figure 1:
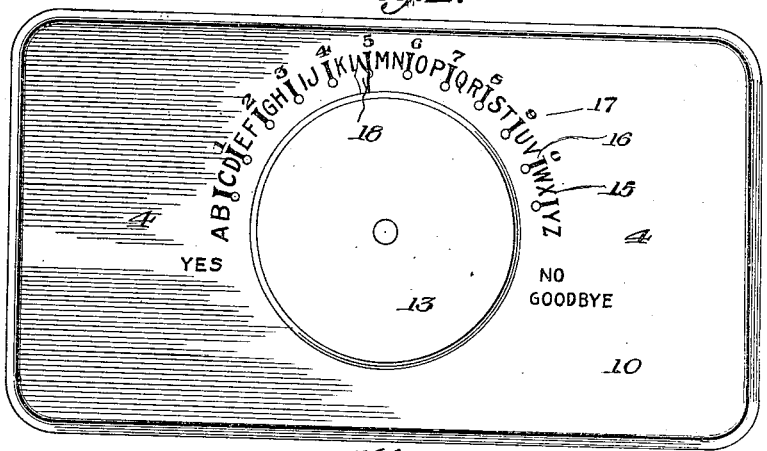
Figure 1 is a plan view of the board forming the subject matter of my invention.
Figure 2:
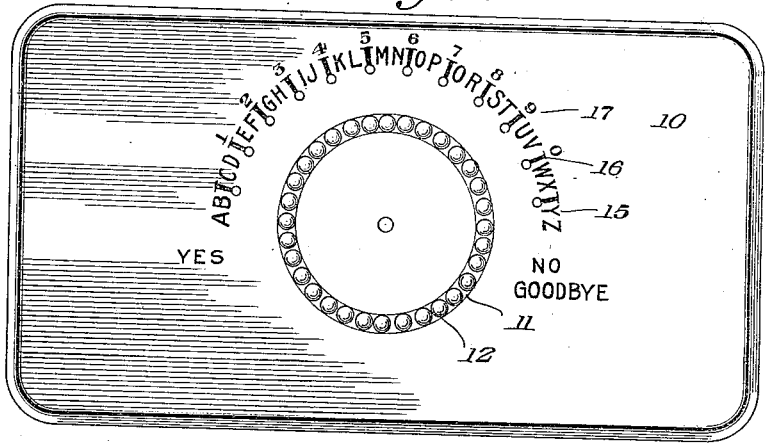
Figure 2 is a fragmentary plan view showing the rotary member removed from the board.
Figure 3:
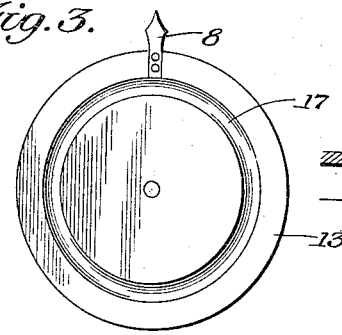
Figure 3 is a bottom plan view of the rotary member.
Figure 4:
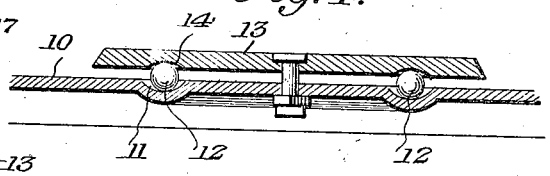
Figure 4 is a sectional view taken on line 4—4 of Figure 1.

Referring to the drawing in detail, 10 indicates the board proper which is provided with a circular groove 11 disposed concentrically about the center of the board, and in which groove are arranged ball bearings or the like 12. The rotary member is indicated at 13 the underside of which is also provided with a circular groove 14 to partly receive the ball bearings 12 so that the rotary member is rendered very sensitive and can be very easily moved. The board 10 is provided with the letters of the alphabet as indicated at 15, these letters being suitably spaced apart. The board is provided with indicating characters 16, there being one of these characters between every two letters of the alphabet, and above each indicating character is a numeral indicated at 17. The numerals are preferably arranged in consecutive order from the beginning to the end of the alphabet as shown. Carried by the rotary member 13 is a pointer 18 the latter projecting beyond the periphery of the rotary member and adapted to cooperate with the letters and numerals above referred to spelling various words and to combine the numerals in the production of any particular number. The board is used in the manner similar to the well-known ouija board, the fingers of the user being lightly placed upon the rotary member whereby the latter is gradually turned in one direction or the other, moving the pointer 18 to selectively group a number of letters or numerals for the purpose above mentioned.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A ouija board comprising a board proper having a circular groove, a rotary finger engaging member arranged centrally of said board and having an annular groove on the under side thereof, ball bearings arranged in said grooves, letters of the alphabet arranged upon the board proper and in concentric relation to said rotary member, numerals arranged adjacent said letters in a similar relation, other indicia arranged upon said board, and a pointer projecting from the periphery of the rotary member and cooperating with all the indicia upon said board for the purpose specified.

In testimony whereof I affix my signature.

JOHN R. DONNELLY.